Patented Nov. 17, 1942

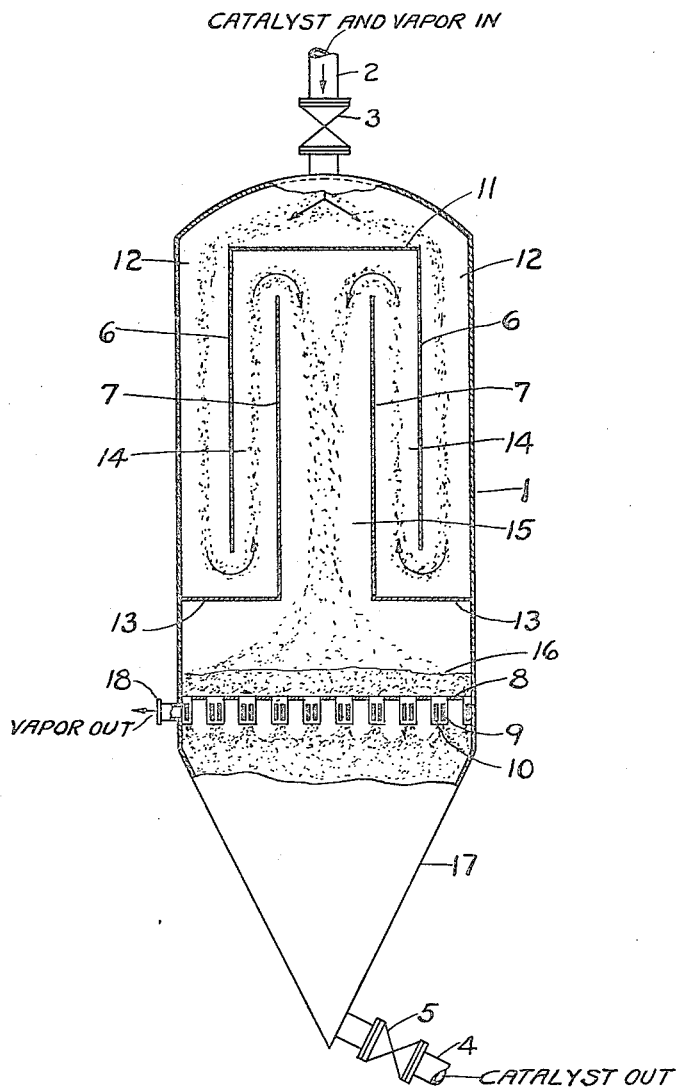

2,302,328

UNITED STATES PATENT OFFICE 2,302,328

HYDROCARBON CONVERSION

Louis J. Kelly, Teaneck, N. J., assignor to The M. W. Kellogg Company, Jersey City, N. J., a corporation of Delaware Application June 29, 1940, Serial No. 343,089

10 Claims. (Cl. 196—52)

This invention relates to the catalytic conversion of hydrocarbons and more especially to the catalytic conversion of hydrocarbons into gasoline constituents of high anti-knock value.

It has heretofore been proposed to suspend a finely divided or powdered catalytic material in a stream of hydrocarbon vapors or gases and to pass this stream of catalyst suspended in the vapors or gases under the working conditions of temperature and pressure through a suitable reaction zone wherein the desired conversion of the hydrocarbons is effected. The catalytic particles suspended in and carried along with the reaction products are thereafter separated and the reaction products further processed to recover the desired constituents. In the separation of the powdered or finely divided catalytic material it has been necessary to pass the reaction products and catalytic material to a suitable separation zone wherein the actual separation is effected. Various forms of separating zones have been proposed and the most commonly resorted to is either a cyclone type of separator or some suitable form of precipitator. Separators of this type present difficulties in maintenance and add materially to the initial cost of any catalytic plant involving a moving stream of vapors commingled with suitable catalytic material.

An object of my invention is to provide a process and apparatus for separating catalytic material commingled with the vapors undergoing reaction by the passage of the commingled vapors and catalytic material through a finely divided material, such as part of the catalytic material previously used, to filter or trap catalytic material contained in the vapor stream and effect further conversion of the vapor.

Another object of my invention is to provide a process and apparatus for catalytically converting hydrocarbons wherein at least partially converted hydrocarbons are separated from the catalytic material previously admixed therewith and then withdrawn from the reaction zone containing the separated catalytic material in a simple and efficient manner.

Other objects of this invention will be apparent to those skilled in the art from the following description.

In practicing the invention a mixture of finely divided catalyst, such as powdered catalyst, and hydrocarbon vapors are introduced into a suitable reaction zone at the desired operating conditions of temperature and pressure and are therein at least partially converted into the desired products. The thus converted hydrocarbons and finely divided catalytic material commingled therewith are passed through a bed of catalytic material previously separated from the hydrocarbon stream, this bed of hydrocarbon material filtering or trapping out of the hydrocarbon stream the catalytic material commingled with the vapors and at the same time exerting its catalytic effect on the vapors passing therethrough to complete the desired reaction. In accordance with my invention excessive accumulation of catalytic material in the bed is prevented by providing for the continuous removal of a predetermined quantity of the catalytic material contained in said bed to an area containing another bed of the same type of catalytic material. In the passage of the catalytic material from one bed to another, the hydrocarbon vapors are withdrawn from the sphere of reaction, substantially free from catalytic material, by maintaining a pressure drop across the zone of withdrawal of smaller magnitude than the pressure drop across the second bed of catalytic material.

My invention will be further described with reference to the accompanying drawing which shows diagrammatically in cross section suitable apparatus for practicing the invention.

In the drawing I have not shown apparatus for forming the desired mixture of hydrocarbon vapors and finely divided or powdered catalysts nor have I shown a recovery system for the reaction products or a regeneration system for the spent catalytic material as such features are well understood by those skilled in the art and do not constitute part of my invention.

In the drawing there is shown an enlarged vessel or reactor 1 having an inlet pipe 2 controlled by a valve 3 for admitting hydrocarbon vapors and catalytic material and an outlet pipe 4, controlled by a pressure reduction valve 5, for withdrawing spent catalytic material. The reactor 1 is provided with depending baffles 6 and upwardly extending baffles 7. A tube sheet 8 extends across the entire cross-sectional area at the lower portion of the reactor 1 and this tube sheet is suitably perforated to receive a plurality of relatively short lengths of tubes 9, of, say, from six to eighteen inches in length. Each of the tubes is slotted as diagrammatically illustrated at 10 and these slots are covered with suitable fine screen material for the purpose to be later described. Preferably each tube has an area cut out by slotting, of about three or four times the cross-sectional area of each tube.

A mixture of hydrocarbons and commingled finely divided or powdered catalytic material, formed in any suitable manner, is introduced through line 2 into the upper part of the reactor 1. As shown in the drawing, plate 11 prevents the mixture from entering the central part of the reactor and the sides of the reactor and the depending baffles 6 form an annular passage 12 for the passage of the hydrocarbon vapors and commingled catalytic material. It may be desirable to provide the upper part of the reactor with a suitable distributing device, not shown, to insure even distribution of the mixture through the entire annular space 12. Plates 13 are provided below the baffles 6 to support the upwardly extending baffles 7, and the hydrocarbons and catalytic material are forced as a mixture through the annular space 14 defined by the baffles 6 and 7. After passing through the annular space 14 the vapors and commingled catalytic material are conducted through a central space 15 to the enlarged area within the reactor defined by the plate 13 and the tube sheet 8. A suitable distributing device may likewise be positioned in proximity to the outlet of the central space 15 to evenly distribute the mixture of catalytic material and hydrocarbons throughout the enlarged area between the elements 13 and 8.

The velocity of the reacted hydrocarbons and commingled catalytic material in spreading out in the enlarged portion of the reactor between the plates 13 and tube sheet 8 is reduced somewhat. This reduction in velocity facilitates the separation of the catalytic material from the reacted vapors.

During operation a shallow layer or bed of catalytic material 16 is maintained above the tube sheet 8. This bed may vary considerably in thickness and is generally between 3 and 12 inches in thickness, preferably about 6 inches. The shallow bed 16 functions to filter or trap out from the vapor stream catalytic material which was in suspension with the vapors in the passage through the reaction spaces 12, 14 and 15. The vapors thus pass through the shallow bed 16 into the plurality of tubes 9 from which they are withdrawn through the screened slotted areas 10. Due to the decreased velocity of the vapors in passing through the shallow bed 16 and tubes 9 there is eliminated any tendency of the vapors to force catalytic material through the screened portions 10, that is, the screened portions 10 completely filter out substantially all catalytic material that may be entrained with the reacted vapors. Simultaneously with the passage of the vapors into the tubes 9 and then through the screened outlet portions 10, catalytic material is constantly withdrawn through the same tubes 9 to a lower inverted conical portion 17 of the reactor 1. The portion 17 is substantially filled with catalytic material during operation from the discharge end of the tubes 9 to the bottom thereof.

Spent catalytic material is withdrawn from the bottom portion of the inverted cone through line 4 controlled by valve 5 substantially at the rate at which fresh catalyst is introduced into the reactor, along with the hydrocarbons, through line 2. In this manner the section 17 is completely filled with catalytic material to the discharge end of the tubes 9 and the bed 8 is maintained at a constant thickness. In order to insure against packing of the catalytic material in the section 17 a suitable agitating device, not shown, may be located in the section 17 to facilitate constant withdrawal of the catalytic material.

By maintaining a relatively large body of catalyst below the discharge end of the tubes 9 and no catalyst in the spaces between these tubes, the pressure drop across the tubes to the point of outlet of the vapors is materially less than the pressure drop across the bed of catalytic material extending from the discharge end of the tubes 9 to the outlet line 4. This smaller pressure drop enables the vapors leaving each of the tubes 9 through the sceened portions 10 to be withdrawn from the reactor substantially free of catalytic material. Thus the vapors in leaving the screened portions 10 flow around the various tubes 9 to a withdrawal outlet 18 from which they are passed to suitable fractionating equipment, well understood by those skilled in the art, to recover the desired constituents from the reaction products.

It will be evident that the shallow bed 16 is in reality a moving bed in that catalytic particles are constantly withdrawn and added to this bed, the rate of withdrawal and addition being substantially the same. The bed 16 functions both as a material which traps or filters catalytic material suspended in the vapors and also as an additional source of catalytic activity whereby the catalytic reaction initially carried out in the reactor 1 is substantially completed by the passage of the vapors through the shallow bed 16.

The baffle type of reactor shown in the drawing need not be used to practice my invention and other suitable types of reactors may be substituted therefor. For example, instead of using a baffle reactor of the type illustrated, a tall vertical reactor or any suitable type of coil may be employed. Likewise one or more reactors may have the discharge end thereof placed in a constantly moving bed of catalyst, the moving bed filtering catalyst from the reaction products as they pass therethrough.

My invention may be applied to various catalytic conversion operations, such as catalytic cracking of heavier hydrocarbon oil, in the vapor state, to light hydrocarbons in the motor fuel boiling range, the catalytic reforming of naphtha, catalytic polymerization of gases and other well-known types of catalytic processes. It is particularly applicable, however, in the catalytic cracking of oil, such as gas oil, and the catalytic reforming or aromatization of naphtha.

Various catalysts may be used and the type selected will depend upon the process being practiced. In the cracking of hydrocarbon oil I prefer to use catalysts of the silica alumina type, such as the so-called natural catalysts of the clay type, for example, Super-Filtrol which is an acid-treated bentonite. Similar synthetic catalysts may likewise be employed. For dehydrogenation, reforming or aromatization it is preferred to use oxides of the metals of the sixth group, such as molybdenum or chromium, deposited on alumina. Obviously, any type of catalytic material may be used and those mentioned are merely for illustrative purposes.

My invention is particularly applicable to the utilzaition of a catalyst in powdered form, that is, catalysts of relatively small particle size which permit suspension thereof in a vapor stream of reasonable veolcity. The powdered catalyst may vary somewhat in size but generally it is preferred to use catalyst particles which will pass through a screen of 100 to 400 mesh.

It may prove desirable to commingle coarser catalytic material of from about 10 to 100 mesh with the powdered catalyst to prevent the powdered catalytic material from packing in the shallow bed 16 or in the bed maintianed in the section 17. The coarse catalytic material thus incorporated aids in the filtering or trapping of the catalytic material contained in the vapor stream and keeps the powdered catalyst physically separated to a great extent thus preventing its packing. Generally I prefer to add a relatively small amount of the coarser catalytic material, say, about 10% by weight. The point of introduction of the coarser catalytic material is dependent upon the size of particles. For example, for small size particles about 50 to 100 mesh, the coarser material may be added to the commigled vapor and powdered catalyst entering the reactor. For larger size particles about 10 to 50 mesh, the coarser material may be added at a point immediately posterior to the relatively shallow bed 16. For example, such coarser material may be added to the stream in the central section 15 or may be added in the enlarged area between plate 13 and tube sheet 8.

As an example of the cracking of gas oil having a gravity of 31.4° A. P. I. to lower boiling products having the required amount of gasoline constituents, a tempertaure of from about 800 to 1000° F. and a pressure of from about 25 to 200 pounds per square inch may be employed. The velocity of the gas oil vapors may vary from 1 to 50 feet per second and the contact time may vary from 3 to 60 seconds. Generally I prefer to employ a high catalyst to oil ratio, that is, a ratio by weight of catalyst to oil greater than 2½ to 1, for example, as high as 20 to 1. In an example of catalytically reforming naphtha with a dehydrogenating and cyclizing catalyst to convert large portions of aliphatics in the charge stock to aromatic compounds, a temperature of from about 900 to 1050° F. and a pressure of from about 25 to 500 pounds per square inch may be employed. The velocity may vary from 1 to 50 feet per second and the contact time from 1 to 50 seconds. A high catalyst to oil ratio is also preferred in this operation.

While I have described my invention in detail it will be clearly understood that many modifications thereof may be made without departing from the spirit and scope of the appended claims.

I claim:

1. In a process wherein hydrocarbons in a vaporous state are converted into more valuable products while in intimate contact with a finely divided solid catalytic material in the passage of said vapors and catalytic material through a reaction zone, the improvement which comprises passing said vapors and catalytic material after at least partial conversion thereof in said reaction zone through a bed containing catalytic material to trap particles of said catalytic material commingled with said vapors and removing converted hydrocarbon vapors substantially freed from said catalytic material for recovery of valuable products therefrom.

2. In a process wherein hydrocarbons in a vaporous state are converted into more valuable products while in intimate contact with a finely divided solid catalytic material in the passage of said vapors and catalytic material through a reaction zone, the improvement which comprises maintaining a bed of said catalytic material in the path of the vapors undergoing conversion, passing said vapors and catalytic material after at least partial conversion thereof in said reaction zone through said bed of catalytic material to trap particles of said catalytic material commingled with said vapors and removing converted hydrocarbon vapors substantially freed from said catalytic material for recovery of valuable products therefrom.

3. In a process wherein hydrocarbons in a vaporous state are converted into more valuable products while in intimate contact with a catalytic material in the passage of said vapors through a reaction zone, the improvement which comprises maintaining a bed of said catalytic material in the path of the vapors undergoing conversion, passing said vapors after at least partial conversion thereof in said reaction zone through said bed of catalytic material to trap particles of catalytic material commingled with said vapors, maintaining a second bed of said catalytic material separated from said first-mentioned bed by a plurality of outlets, the pressure drop across said plurality of outlets being less than that through said second bed and withdrawing converted hydrocarbon vapors from said plurality of outlets for recovery of valuable products therefrom.

4. In a process wherein hydrocarbons in a vaporous state are intimately commingled with finely divided catalytic material for continuous passage through a reaction zone to convert said hydrocarbons into more valuable products, the improvement which comprises maintaining a bed of said catalytic material in the path of the vapors undergoing conversion, continuously passing said vapors after at least partial conversion thereof in said reaction zone through said bed of catalytic material to trap particles of catalytic material commingled with said vapors, continuously withdrawing catalytic material from said bed to prevent excessive accumulation thereof by the trapping of catalytic material commingled with said vapors and withdrawing converted hydrocarbons after passing through said bed to recover valuable products therefrom.

5. A process in accordance with claim 4 wherein the quantity of catalytic material continuously withdrawn from said bed is substantially equal to the quantity trapped from the vapors.

6. In a process wherein hydrocarbons in a vaporous state are intimately commingled with finely divided catalytic material for continuous passage through a reaction zone to convert said hydrocarbons into more valuable products, the improvement which comprises maintaining a bed of said catalytic material in the path of the vapors undergoing conversion, continuously passing said vapors after at least partial conversion thereof in said reaction zone through said bed of catalytic material to trap particles of catalytic material commingled with said vapors, continuously withdrawing catalytic material from said bed to prevent excessive accumulation thereof by the trapping of catalytic material commingled with said vapors, collecting catalytic material thus withdrawn in a space separated from said bed and maintaining a greater pressure drop through said collected catalytic material than to a point of withdrawal of said converted vapors to effect withdrawal of said vapors without the passage thereof through said collected catalytic material.

7. In a process wherein hydrocarbons in a vaporous state are intimately commingled with finely divided catalytic material for continuous passage through a reaction zone to convert said hydrocarbons into more valuable products, the improvement which comprises maintaining a bed of said catalytic material in the path of the vapors undergoing conversion, continuously passing said vapors after at least partial conversion thereof in said reaction zone through said bed of catalytic material to trap particles of catalytic material commingled with said vapors, continuously withdrawing catalytic material from said bed through a plurality of passages to prevent excessive accumulation thereof by the trapping of catalytic material commingled with said vapors, collecting catalytic material thus withdrawn in a space immediately adjacent the discharge end of said passages and withdrawing converted hydrocarbons from said passages substantially freed of catalytic material without the passage thereof through the catalytic material thus collected.

8. In a process wherein hydrocarbons in a vaporous state are intimately commingled with finely divided catalytic material for continuous passage through a reaction zone to convert said hydrocarbons into more valuable products, the improvement which comprises commingling coarser catalytic material than said finely divided catalytic material therewith for passage through said reaction zone, maintaining a bed of said catalytic material and said coarser catalytic material in the path of the vapors undergoing conversion and passing said vapors and commingled catalytic material through said bed to trap particles of catalytic material commingled with said vapors.

9. A process in accordance with claim 8 wherein said coarser catalytic material constitutes a minor proportion of the mixture of finely divided catalytic material and coarser catalytic material.

10. In a process wherein hydrocarbons in a vaporous state are converted into more valuable products while in intimate contact with a finely divided solid catalytic material, the improvement which comprises passing said vapors and finely divided catalytic material commingled therewith through a bed containing catalytic material to trap particles of said finely divided catalytic material from said vapors and removing converted hydrocarbon vapors substantially freed from said finely divided catalytic material for recovery of valuable products therefrom.

LOUIS J. KELLY.

2,302,328.—*Louis J. Kelly*, Teaneck, N. J. HYDROCARBON CONVERSION. Patent dated Nov. 17, 1942. Disclaimer filed Apr. 19, 1945, by the assignee, *The M. W. Kellogg Company*.

Hereby enters this disclaimer to claims 1, 2, 4, and 10 of said patent.

[*Official Gazette May 29, 1945*.]